ких
United States Patent
Kåll et al.

(10) Patent No.: US 7,418,256 B2
(45) Date of Patent: Aug. 26, 2008

(54) METHOD OF INVOKING PRIVACY

(75) Inventors: Jan Kåll, Espoo (FI); Ahti Muhonen, Hiryihaara (FI); Michael Mulligan, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/250,634

(22) PCT Filed: Apr. 9, 2001

(86) PCT No.: PCT/FI01/00347

§ 371 (c)(1), (2), (4) Date: Oct. 28, 2003

(87) PCT Pub. No.: WO02/054808

PCT Pub. Date: Jul. 11, 2002

(65) Prior Publication Data

US 2004/0054598 A1    Mar. 18, 2004

(30) Foreign Application Priority Data

Jan. 4, 2001  (FI) ................................. 20010012

(51) Int. Cl.
*H04M 1/66* (2006.01)

(52) U.S. Cl. ................... 455/411; 455/410; 455/418; 709/206; 709/203; 726/4

(58) Field of Classification Search ............... 455/410, 455/411, 414.2, 418; 709/206, 203; 713/4
See application file for complete search history.

(56) References Cited

U.S. PATENT DOCUMENTS 6,175,740 B1 * 1/2001 Souissi et al. ............ 455/456.3

(Continued)

FOREIGN PATENT DOCUMENTS

KR    1998-032189    7/1998

(Continued)

OTHER PUBLICATIONS

Bob Askwith, Madjid Merabti, Qi Shi, and Keith Whiteley, "Achieving User Privacy in Mobile Networks," Computer Security Applications Conference, 1997.

*Primary Examiner*—Danh C Le
(74) *Attorney, Agent, or Firm*—Hollingsworth & Funk, LLC

(57) ABSTRACT

The invention relates to a method of invoking privacy related to a user equipment (1) capable of accepting push messages in communications network, which push message is a message a server may send to the user equipment (1) without the user of the user equipment (1) asking for it and the server having the ability to be able to act as a push message initiator. The method comprises the steps of: (i) sending a first request for the personal user data from the user equipment (1) to an origin server (2) over a first channel (A); (ii) the origin server (2) sending a request for personal user data to a supporting server (3); (iii) the supporting server (3) sending a push message over a narrow band channel (C) to the user equipment (1) indicating said request for the user data made by the origin server (2); (iv) the user equipment (1) responding to the push message at least by an allowing message or a disallowing message for the request of data over said narrow band channel; and (v) the supporting server (3) providing the data to the origin server (2) at least partly in response to the allowing message, and rejecting the data providing otherwise.

13 Claims, 1 Drawing Sheet

U.S. PATENT DOCUMENTS

| | | | |
|---|---|---|---|
| 6,311,069 B1 * | 10/2001 | Havinis et al. | 455/456.4 |
| 6,377,810 B1 * | 4/2002 | Geiger et al. | 455/456.2 |
| 6,424,718 B1 | 7/2002 | Holloway | |
| 6,640,184 B1 * | 10/2003 | Rabe | 701/207 |
| 6,925,307 B1 * | 8/2005 | Mamdani et al. | 455/466 |
| 2002/0068554 A1 * | 6/2002 | Dusse | 455/419 |

FOREIGN PATENT DOCUMENTS

| | | |
|---|---|---|
| WO | WO 00/35236 | 6/2000 |
| WO | WO 00/78005 | 12/2000 |
| WO | WO 00/79811 | 12/2000 |

* cited by examiner

METHOD OF INVOKING PRIVACY

FIELD OF THE INVENTION

The present invention relates to communications systems, and more particularly to mechanisms that support privacy invoking. The invention also relates to the use of user data within guidelines such as those outlined by the US FTC (United States Federal Trade Commission).

BACKGROUND OF THE INVENTION

The interaction model of World Wide Web WWW is based on a simple client-server interaction as shown in FIG. 1. The client-server relationship can be defined by the relationship between functional entities (for example, managed objects or network layers) in which one entity uses a service provided by another. The user of the service may be called a "client" and the provider of the service may be called a "server". The term interaction can be described as a situation that occurs when one service affects the operation of the other service.

The basis of WWW interaction is that the client requests a resource from the server based on a uniform resource identifier (URI), e.g. uniform resource locator (URL). This identifier individualizes both a file or a directory in the Internet and a protocol needed to use them. Based on this interaction model the server is able to provide some service to the client.

In the process of this interaction the server will often require data from the client. Such data may include the client's PKI (Public Key Infrastructure) Digital Certificate, or perhaps some details about the user on whose behalf the client makes the requests (e.g. username, password, users address).

Due to various constraints in the wireless world the interaction model differs from the model described above. In the wireless model an additional server is introduced to distribute the load across the network. This interaction model is shown in FIG. 2. Instead of making the request of the client directly via the link A, the origin server can request information about the client off the supporting server via the link B.

These supporting servers have many uses. Some examples are:
  gathering location data about the user (Location Servers);
  storing and distributing of identity certificates on behalf of the user (Certificate Servers);
  describing the attributes of a user's terminal (User Agent Profile Server); and
  acting as repositories of data.

For various reasons (including legislative) it is considered that personal data should be distributed within strict guidelines. In recent years there has been growing concern about users' privacy on the Internet. This has lead to various guidelines and directives from organizations like OECD (Organization for Economic Co-operation and development) and EU (European Union). The guidelines although quite similar from the various sources are well summed up by the US FTC (United States Federal Trade Commission) Fair Information Practices (FIP) in the Electronic Marketplace. The FIP recommends that users' privacy should follow the 4 following guidelines (http://www.ftc.gov/privacy/index.html):
  Notice—A user should be notified what personal data is used, who is using it, and how it is used;
  Choice—A user should have a choice as to whether or not to allow that use;
  Access—A User should have access to that data where ever it is used; and
  Security—User data should be protected at all times using reasonable security precautions.

The World-Wide-Web Consortium (W3C) has defined a mechanism for terminals to determine the conditions under which personal information may be transmitted to applications. The mechanism is called P3P (Patform for Privacy Preferences. It is actually a framework for:
  defining privacy policy on application servers (i.e. specifying formally what information is gathered and how it is used);
  defining how clients may define their own privacy preferences; and
  how privacy policies may be compared.

P3P does not prescribe specific implementations (beyond relying upon XML (Extensible Markup Language) for defining the policies), but several prototype systems provide the following functions:
  alerting the user each time a WWW site is accessed whose policy differs from the user preferences; and
  requesting the user to authorize the transmission of personal information to the WWW-site.

There exist two state of the art methods for accessing control to user data. A very common access control method is that of using black/white list to control the access to a resource. A black list is a list of entities not allowed to access the resource. If the black list exists all entities are allowed to access the list except those on the black list. A white list is the list of entities allowed to access the resource. If the white list exists no entities are allowed to access the list except those on the white list.

Although this is a rather simple way to provide the level of privacy protection there are some drawbacks, reasons why the method is not applicable to support privacy invoking within guidelines. It is a static method and it has no way of dynamically dealing with data requests. Supposing the user wishes to visit the origin server. The steps they would have to go through are as follows:
  1) First they would have to determine what data the origin server may require;
  2) Then they would have to go to the appropriate supporting server (or servers as there may be several involved);
  3) Then they can proceed to the origin server in order to be served.

Furthermore, there is only the possibility of black or white lists. There is no capability of having a "grey" list where the user is queried to see if they wish to allow the origin server have the data.

Another possibility for accessing control is a method in which the origin server assembles a set of the data it requires and presents it as a list for the client to digitally sign. The origin server then presents this digitally signed list to the supporting server when requesting the personal user data. This method would however involve extra round trips and cryptographic processing on the client. It was precisely these problems that required the use of supporting servers. In other words this scheme would negate the advantage of supporting servers.

The scheme relies on PKI which in turn requires digital certificates. As the digital certificate itself can contain personal user data the simple fact of using the digital certificate could in itself compromise user privacy.

Partially due to the fact that "Privacy" as such is a new area there has been no efforts made in the standards which refer to supporting servers to address the privacy issue. It can clearly be seen from the above use cases that the data contained on supporting servers is personal user data, and that data should be used in accordance with the appropriate privacy guidelines.

One of the problems associated with the above mentioned current situation is that privacy has not been addressed in wireless Internet standards. Thus there is no defined nor implemented method for supporting servers to protect the privacy wishes of users. Currently the situation with supporting servers is that there is no intervention on behalf of the user when the supporting server receives the request for information. This means that there is no way for the user to receive notice or make a choice with regards to her/his own personal data.

BRIEF DESCRIPTION OF THE INVENTION

It is thus an object of the present invention to provide a new mechanism for supporting privacy invoking in communications systems. The object of the invention is achieved by a method and an arrangement which are characterized by what is stated in the independent claims. The preferred embodiments of the invention are disclosed in the dependent claims.

The invention is based on the idea of using a narrow band push channel from a supporting server to a client in order to inform the client about a request for personal data which the supporting server is in possession of. The user can then respond to this request stating whether s/he wishes to allow this request or not.

It is an advantage of the method and the arrangement of the invention that they allow the user to have a choice over whether their personal data is used or not.

Another advantage of the method and the arrangement of the invention is that no previous relationship between the origin server and the supporting server it required.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
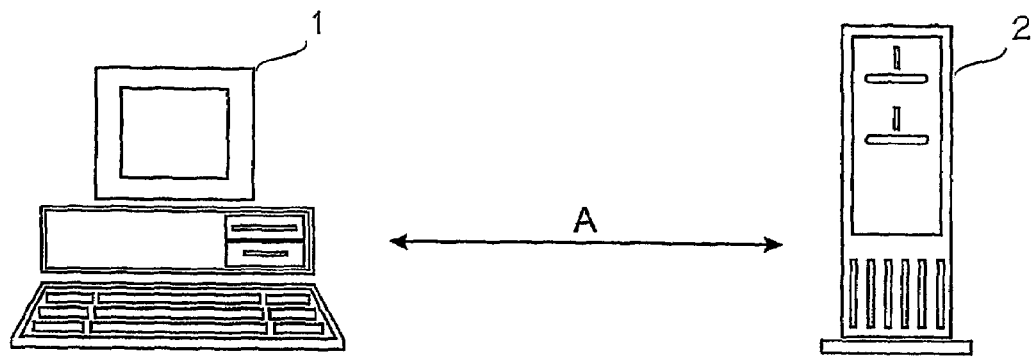
FIG. 1 illustrates a prior art WWW interaction model.
Figure 2:
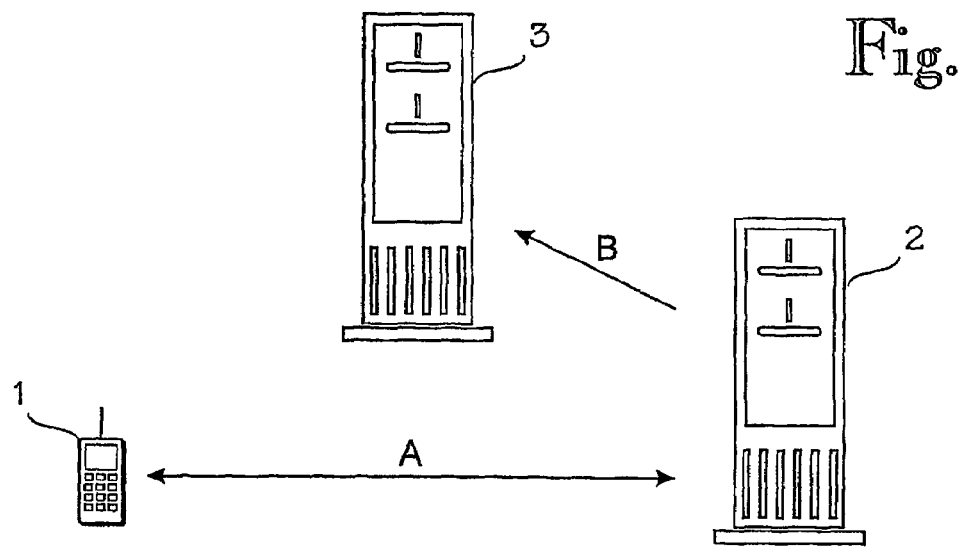
FIG. 2 illustrates a prior art wireless Internet interaction model.

A general system chart of a communications system to which the invention can be applied may comprise a user equipment that can be a conventional mobile station equipped with a short message service. Although in the following the invention will be described by means of a short message, a short message service, a WAP (Wireless Application Protocol) message and a WAP message service, a message can comprise e.g. at least one of the following messages: a short message, an instant message, an e-mail message, a multimedia message, a unified messaging message, a WAP message or a SIP (Session Initiation Protocol) message. The mobile station can also be mobile station equipped with e.g. an instant message, an e-mail message, a multimedia message, a unified messaging message or a SIP (Session Initiation Protocol) message service.

The basic principles of the invention can be employed to enable privacy invoking between and/or within any mobile communications systems, such as GSM, GPRS, TETRA and UMTS.

The invention may affect some of the elements of an end-to-end system for wireless applications. In the privacy invoking system a client element (referred to a client later on in this application) can be described to be any element which has the ability to receive and handle push messages. One client element can be a typical mobile WAP terminal equipped with this ability.

Supporting repository server element (referred to a supporting server later on in this application) can be described to be any element which has the ability to send push messages to the client, triggered by requests for delivering personal information to other servers. One such supporting server can be a typical server equipped with this ability.

In other words, in order to implement the invention and its embodiments terminals would need to be capable of accepting push messages and the supporting server would require the ability to be able to act as a push initiator. In addition some procedural logic would be required in the terminal and the supporting server.

The narrow band push channel may be defined as a channel over which data or signaling can be sent by a server e.g. without a prior request received from a client. An example on this kind of a channel is a SMS (Short Message System) channel. Currently SMS may be seen as a unique feature within the wireless world though it's popularity is leading to it being replicated in the broader Internet. Also other types of channels, which are built on asynchronous transfer of data (i.e. not request/response) may be considered a push channel.

The invention proposes the use of a narrow band push channel from the supporting server to the client in order to inform the client about a request for personal data which the supporting server is in possession of. The user can then respond to this request stating whether s/he wishes to allow this request or not. The invention thus proposes to exploit this push channel to protect users' privacy and provide better fulfillment of appropriate privacy directives.

Figure 3:
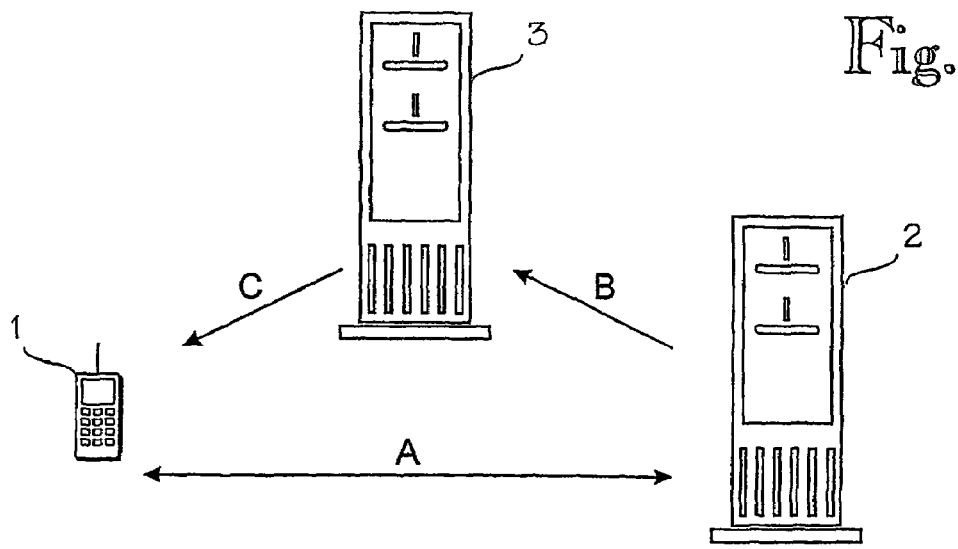
FIG. 3 shows a privacy protection in supporting server according to the invention.

In FIG. 3 there is an extra link drawn between the supporting server and the client. This link, link C, is called the push channel link. The sequence of data flows when using the push channel link may be as follows:

1) The client 1 makes the request for the resource to the origin server 2 over a first channel (A);

2) The origin server 2 make the request to the supporting server 3 requesting some personal user data;

3) The supporting server 3 sends a push message over the narrow band channel (C) indicating that the origin server 2 has made the request for the data; (This step is related to the FTC guideline regarding Notice and personal data.)

4) The client 1 responds to the push allowing or disallowing the request for data. (This step is related to the FTC guideline regarding Choice and personal data.) The response may be a simple yes/no. Alternatively the client 1 and the supporting server 3 may negotiate on what data is given and for what purposes; and 5) Depending on the client's 1 response the supporting server 3 will either deliver the data to the origin server 2 or refuse to deliver the data to the origin server 2.

The data which the origin server needs requires processing power on the client which the client does not have. In this case the supporting server supplies the required processing power.

There are many ways of implementing the above-mentioned mechanism. Two alternatives may include the implementation of the invention as an SMS implementation or as a WAP Push implementation.

In an SMS implementation the supporting server would need to support an interface to an SMSC (Short Message Service Center). When the request for personal data arrives from the origin server the supporting server would send the SMS to the client notifying her/him of the origin server's request. The client can then respond indicating her/his preference for the supporting server to accept or reject the origin server's request. The exact content of the SMS messages can be for example a small implementation detail as described above:

1) Supporting Server→Client: "MyBank at www.mybank-.com requests your location. Do you wish to give it to them? YES/NO".

2) Client→Supporting Server: "YES"

In a WAP system there is defined a Push framework [Push]. The framework defines 3 components: a Push Client, a Push Initiator PI and a Push Proxy Gateway PPG. Within this implementation the wireless client is also the Push Client capable of receiving WAP Push messages. The Supporting Server in this case acts as the Push Initiator, creating the Push message for delivery to the client. In between the 2 entities there is an entity known as the PPG. The PPG's role is to handle the addressing and delivery of the Push message from PI to the Push Client.

Also in this implementation the exact format of the messages to be passed can be determined but the general procedure would be for the supporting server PI to compose the Push message detailing the origin server's request for personal data. The client would then respond to the message indicating their privacy preferences with regard to the origin servers request.

As described above, the core idea of the invention is the use of the push narrow band channel to alert the user to the use and/or trying to use of their personal data. The response from the user may simply be a simple yes/no response indicating the user's acceptance of the origin server request for the personal data. The response may also be some other type response if it can be read in the supporting server.

However it is also possible that the push message can initiate a pull session allowing the user to negotiate which information they may wish to divulge. In the pull session the client may request data and the data may be returned on a pull channel. For example, if the origin server requests username and credit card details, the user could respond indicating s/he only wishes to divulge her/his name.

As described above the invention may be applied within the WAP system. One reason for this is the fact that supporting servers are well defined within the architecture of WAP being generally at the forefront of standardisation of the wireless Internet. However the scope of this invention is beyond the scope of the WAP system and architecture and the principle of supporting servers extends beyond the WAP architecture. For example, Location Servers are to be found in 3G (3rd Generation) environments regardless of whether that environment is a WAP environment. The use of certificate URI's is also being extended to the traditional web model. The transmission of user agent profiles is based on W3C work on CC/PP (Composite Capability/Preferences Profiles). In fact the deployment of supporting servers makes sense in any network where there is a wish to make efficient use of bandwidth.

Some of the supporting servers In WAP are described below:

Certificate Server [WPKI, Wireless Public Key Infrastructure].

As a part of the secure handshake in the Internet security protocol SSL/TLS (Secure Sockets Layer/Transport Layer Security) the client and the server may exchange PKI Digital Identity Certificates in order to authenticate each other. The exchange of these certificates can require relatively large bandwidth in a wireless network. For this reason the wireless equivalent of SSL/TLS, WTLS (Wireless Transport Layer Security) allows for a certificate URI to be sent in place of the certificate. This allows for the origin server to retrieve the client's identity certificate from another location on the network (i.e. the supporting server for certificates).

UAProf Server [UAProf].

One of the characteristics of wireless clients is that their characteristics and form factors are vastly different. This is not the case with the WWW, where clients are relatively homogenous. WAP has defined a specification known as UAProf (User Agent Profile) which allows the client to transmit its characteristics to the origin server. Due to bandwidth considerations the client may also transmit the URI which points to the supporting server that contains details of the client's characteristics.

Location Server [Location].

One unique aspect of the mobile Internet is that physical location is a relevant data value. One method of determining the client's physical location relies on measurements being taken by servers in the supporting network. To provide a common abstraction there is defined the Location Server which is the server which can provide information about the client's location. One unique feature of the Location Server is that it does essentially not even need the client's interaction to be of use. The origin server may simply ask the Location Server for the user's location. This type of interaction is particularly sensitive with regards to user privacy issues.

Although each of the supporting servers provide different functionality there are some commonalties between them. In each case:

the origin server requires some data from the client (e.g. who are they, where are they, what terminal are they using);

the client sends an identifier allowing the origin server to query the supporting server for the data;

the supporting server provides data that in the traditional web model would probably be provided by the client; and the data asked for and provided has some particular reference to the user of the client (e.g. the user's identity in a certificate, the user's client characteristics, the user's physical location).

The invention assumes that there is a way to associate the MSISDN (Integrated Services Digital Network) or fixed IP (Internet Protocol) address of the terminal with the user identification forwarded by the application (whether name & address, cookie, etc) to the repository. One possibility for this is the repository co-located with a wireless gateway, or containing a user database (white pages).

If the user can have several on-going browsing sessions active as in different browser windows, the push message may have to provide an indication of which site is requesting the disclosure of private data. In the case of a background application that requests private information without the prior initiation by the end-user, the situation is substantially similar. The user should be informed about the application that is trying (autonomously) to gather information about her or him.

Whenever the application server, i.e. the origin server requests personal information from the repository, i.e. from the supporting server, the repository may send the push message to the end-user, i.e. to the client requesting confirmation for the delivery of the personal information to the application.

In the state of the art supporting servers released this information without intervention from the client as was described previously. This means that there was no way for the user to receive notice or make a choice with regards to their own personal data. Although in some cases implementations of supporting servers may have allowed a simple form of black/ white listing which ensured that data was only given to selected parties, this method was and is quite static and limited to a predefined select set of origin servers.

One advantage of the invention is that it improves over earlier solutions in that it is dynamic and flexible. There is no requirement for a user to set up preferences with the supporting server(s) prior to visiting the origin server. This process can take place during the user's session with the origin server. However, it should be noted that as an optimisation the supporting server could retain the list of previous user choices as a dynamic black/white list.

The invention allows for gray lists. Instead of just simple black and white lists, it is now possible to have a gray list where entries on the gray list are queried off the user. This can be seen as an improvement on a simple black/white list solution.

Also the user is in control. In other methods the user must inform each and every supporting server that may contain their personal data about their privacy preferences. Using this method the supporting servers ask the user what their preferences are when they need to know what they are.

The mechanism according to the invention saves bandwidth. Other schemes that attempt to allow for interactivity on behalf of the user (such as digital signed requests) consume extra round trips and bandwidth. The mechanism presented here uses minimal extra trips and bandwidth. This is a clear advantage since the bandwidth of the network link between the client and the origin server (shown as link A in FIG. 3) may be very low, or the latency of the link may be poor. With the assistance of the invention the network link between the origin server and the supporting server (shown as link B) may be much higher.

The invention requires no previous relationship between the origin server and the supporting server, or the origin server and the user, client. It also makes use of unique wireless features such as push technology. The invention allows the use of any push channel to communicate directly with the user, not just the signaling channel of a communications network.

The invention and its preferred embodiments do not assume the presence of a privacy preference negotiation framework (such as P3P), although it could be used in that context. The invention does not require entire programs to be downloaded to the terminal in order to perform the negotiation.

The invention differs from P3P in the following way:

It does not assume that the application server sends the description of its privacy policy to the terminal;

It does not assume that the terminal stores privacy preferences; and

It does assume that the notification is carried out on behalf of the client by the repository of personal data.

It differs from the state of the art prototypes and research in the following way:

It relies upon the wireless infrastructure for requesting and transmitting disclosure authorization from the end-user. Published proposals consider only a wireline Internet/WWW infrastructure; and It does not assume that the information is presented as a form that must be filled in by the end-user (or by an automatic form-filling program), but that it is simply requested by applications from repositories containing user information.

It closer mirrors privacy standards. Although it is a new area the W3C does have a privacy standard known as P3P [P3P]. Part of the P3P specification suite is a user privacy preferences language APPEL [APPEL]. APPEL lists 4 possible outcomes when determining whether P3P policies should be accepted. These outcomes are "accept", "reject", "inform", "warn". When translated to supporting servers, this method allows supporting servers to implement the "inform" and "warn" outcomes. This is not possible with e.g. a black/white listing;

The invention relies upon the capabilities of a wireless application infrastructure, and especially push, for requesting and retrieving disclosure authorizations from the end-user. This constitutes a major benefit in the case of non-interactive applications: the user might not have initiated the application (e.g. an automatic WWW crawler trying to compile information from repositories scattered in the Internet) and might not even be on-line, but s/he will nevertheless be informed of the request for disclosure of personal data via push messages on his mobile phone.

A service platform for wireless applications makes it possible to fine-tune the handling of the disclosure requests, e.g. by rejecting the requests automatically if it is determined that the end-user is not reachable.

Still another advantage of the invention is that is not specifically related only to requests for location information, but the invention covers nearly all personal data e.g. usernames, passwords, credit card details, address, date of birth, i.e. basically anything one might normally fill in on an Internet form.

Using a narrow band push channel deals with 2 of the 4 privacy guidelines, namely Notice and Choice. By receiving the push message the user is notified of the request for the use of their private data. They can also respond with to the request stating whether they wish to allow the request or not. This allows the user to have a choice over whether their personal data is used in that fashion or not.

It will be obvious to a person skilled in the art that, as the technology advances, the inventive concept can be implemented in various ways. The invention and its embodiments are not limited to the examples described above but may vary within the scope of the claims.

The invention claimed is:

1. A method of invoking privacy related to a user equipment capable of accepting push messages in a communications network, which push message may be sent by a server to the user equipment without the user of the user equipment asking for it and the server having the ability to be able to act as a push message initiator, the method comprising:
   (i) sending, from the user equipment to an origin server, a first request for a service over a first channel;
   (ii) detecting by the origin server the requested service requiring personal user data comprising user's privacy preferences, said personal user data comprising user's privacy preferences being in the possession of a supporting server which is adapted to be able to act as a push message initiator, said origin server being an application server for the service the first request relates to;
   (iii) the origin server, in response to the request, sending to said supporting server a second request for personal user data comprising user's privacy preferences;
   (iv) the supporting server sending, in response to the second request, a push message over a narrow band channel to the user equipment, said push message detailing the second request and indicating what personal user data comprising user's privacy preferences is requested and for what purpose;
   (v) the user equipment sending to the supporting server, over the said narrow band channel a response to the push message, the response being at least an allowing message or a disallowing message for the requested personal user data comprising user's privacy preferences;

(vi) the supporting server providing at least part of the requested personal user data comprising user's privacy preferences to the origin server in response to the allowing message; and (vii) the origin server providing to the user equipment the requested service in response to the allowing message.

2. A method according to claim 1 wherein prior to the step (vi) the user equipment and the supporting server negotiates on what personal user data is provided to the origin server if the user equipment has sent an allowing message to the supporting server.

3. A method according to claim 2 wherein the user equipment is a WAP equipment in communications network, and that the push message and the allowing message or the disallowing message are routed between the user equipment and the supporting server through a gateway and serving nodes of the communications network.

4. A method according to claim 2 wherein the user equipment is an equipment equipped with a short message apparatus in communications network, and that the push message and the allowing message or the disallowing message are routed between the user equipment and the supporting server through a center and serving nodes of the communications network.

5. A method according to claim 1 wherein the user equipment is a WAP equipment in the communications network, and that the push message and the allowing message or the disallowing message are routed between the user equipment and the supporting server through a gateway and serving nodes of the communications network.

6. A method according to claim 1 wherein the user equipment is an equipment equipped with a short message apparatus in the communications network, and that the push message and the allowing message or the disallowing message are routed between the user equipment and the supporting server through a center and serving nodes of the communications network.

7. A method according to claim 1 wherein the supporting server maintains information thereon that the user has already agreed to reveal information related to her/him to the origin server(s) so that the supporting server need not to send a push message to the user equipment any more.

8. A method according to claim 1 wherein the exchange of push message and allowing or disallowing messages between the user equipment and the supporting server are authorized and/or secured by one or more of IP see, the digital signature or Pretty Good Privacy.

9. A method according to claim 8, wherein both of said authorization and securing is done by one of the following methods: IP sec, the digital signature or Pretty Good Privacy.

10. A supporting server in a communications network, said server being adapted to be able to act as a push message initiator, possess personal user data comprising user's privacy preferences, and to (i) receive a request from an origin server requesting personal user data comprising user's privacy preferences which the supporting server is in possession of;

(ii) send a push message over a narrow band channel to user equipment, said push message detailing the request for the personal user data comprising user's privacy preferences made by the origin server and indicating what personal user data comprising user's privacy preferences is requested and for what purpose;

(iii) receive as response to the push message from the user equipment over said narrow band channel, a message comprising at least an allowing message or a disallowing message for the requested personal user data comprising user's privacy preferences; and (iv) provide at least part of the requested personal user data comprising user's privacy preferences to the origin server in response to the allowing message.

11. A user equipment being adapted to (i) send a request for service over a first channel to an origin server which is an application server for a service the request relates to and which service requires personal user data comprising user's privacy preferences;

(ii) receive, from a supporting server possessing requested personal user data comprising user's privacy preferences, a push message over a narrow band channel, the message indicating what personal user data comprising user's privacy preferences is requested and for what purpose and the origin server; and (iii) respond to the push message over said narrow band channel at least by sending to the supporting server an allowing message or a disallowing message for requested personal user data comprising user's privacy preferences; and (iv) receiving the requested service in response to the allowing message.

12. A communications system comprising:

at least one user equipment adapted to:

(i) send a first request for a service to an origin server over a first channel;

(ii) receive a push message from a supporting server over a narrow band channel, the push message detailing a second request for personal user data comprising user's privacy preferences made by the origin server, in response to the origin server detecting the requested service requiring personal user data comprising user's privacy preferences, to the supporting server and indicating what personal user data comprising user's privacy preferences is requested and for what purpose; and (iii) respond to the push message over said narrow band channel at least by an allowing message or a disallowing message; and at least one supporting server which is adapted to be able to act as a push message initiator, possess the requested personal user data comprising user's privacy preferences, and to:

(i) receive the second request from the origin server, said second request requesting personal user data comprising user's privacy preferences to be delivered to the origin server;

(ii) send said push message over the narrow band channel to the user equipment;

(iii) receive said respond to the push message from the user equipment over said narrow band channel; and (iv) provide at least part of the requested personal user data to the origin server in response to the allowing message, and reject the second request otherwise; and at least one origin server which is adapted to be an application server for the service the first request relates to, and to:

(i) receive said first request for a service over a first channel from the user equipment; and (ii) send said second request to the supporting server in response to the first request.

13. A method of invoking privacy related to a user equipment capable of accepting push messages in communications network comprising a server which possesses personal user data comprising user's privacy preferences relating to the user equipment and is able to act as a push message initiator, said method comprising:

(i) receiving a request from an origin server, said request requesting user's privacy preferences and the origin server being an application server for a service the request relates to;

(ii) sending a push message over a narrow band channel to the user equipment said push message detailing the request for personal user data comprising the user's privacy preferences made by the origin server and indicating what personal user data comprising user's privacy preferences is requested and for what purpose;

(iii) receiving a respond to the push message from the user equipment over said narrow band channel, the respond comprising at least an allowing message or a disallowing message for requested personal user data comprising user's privacy preferences; and (iv) providing at least part of the requested personal user data comprising user's privacy preferences to the origin server in response to the allowing message.

* * * * *

UNITED STATES PATENT AND TRADEMARK OFFICE
CERTIFICATE OF CORRECTION

PATENT NO. : 7,418,256 B2  Page 1 of 1
APPLICATION NO. : 10/250634
DATED : August 26, 2008
INVENTOR(S) : Kåll et al.

It is certified that error appears in the above-identified patent and that said Letters Patent is hereby corrected as shown below:

On the Title Page:

(75) Inventors: "Hiryihaara (FI);" should read --Hirvihaara (FI)--.

In the Specification:

Col. 5, line 56: "In" should read --in--.

In the Claims:

Column 9, Claim 8, line 47: "IP see," should be --IP sec--.

Signed and Sealed this

Seventeenth Day of November, 2009

David J. Kappos
*Director of the United States Patent and Trademark Office*